United States Patent [19]

Peelman et al.

[11] Patent Number: 5,045,254

[45] Date of Patent: Sep. 3, 1991

[54] PROCESS FOR PRODUCING TUBULAR FILM FROM THERMOPLASTIC MOLTEN MATERIAL

[75] Inventors: Paul L. Peelman, Eau Claire; Edward A. Malosh, Chippewa Falls, both of Wis.

[73] Assignee: Amoco Corporation, Chicago, Ill.

[21] Appl. No.: 487,981

[22] PCT Filed: Jan. 17, 1990

[86] PCT No.: PCT/US90/00216

§ 371 Date: Mar. 6, 1990

§ 102(e) Date: Mar. 6, 1990

Related U.S. Application Data

[63] Continuation-in-part of Ser. No. 299,260, Jan. 23, 1989, Pat. No. 4,931,237.

[51] Int. Cl.[5] .............................................. B29C 47/20
[52] U.S. Cl. ....................................... 264/48; 264/50; 264/564; 264/209.2; 264/209.8; 425/4 C; 425/197; 425/380; 425/467; 425/817 C
[58] Field of Search .................. 264/48, 46.1, 50, 564, 264/146, 209.2, 209.8; 425/4 C, 72.1, 192 R, 197, 326.1, 380, 466, 467, 462, 382.4, 817 C

[56] References Cited

U.S. PATENT DOCUMENTS

| | | | |
|---|---|---|---|
| 3,609,809 | 10/1971 | Slicker | 425/192 R |
| 3,809,515 | 5/1974 | Farrell | 425/467 |
| 3,899,276 | 8/1975 | Sokolow | 425/467 |
| 3,932,102 | 1/1976 | Rosenbaum | 425/466 |
| 3,963,403 | 6/1976 | Hughes et al. | 425/467 |
| 4,173,446 | 11/1979 | Larsen | 425/467 |
| 4,402,898 | 9/1983 | Rosenbaum | 264/209.8 |
| 4,931,237 | 6/1990 | Peelman et al. | 264/209.8 |

FOREIGN PATENT DOCUMENTS 1902784 8/1970 Fed. Rep. of Germany ... 264/209.8

Primary Examiner—Jeffery Thurlow
Attorney, Agent, or Firm—Gary J. Cunningham; William H. Magidson; Ralph C. Medhurst

[57] ABSTRACT

A process for producing tubular film from a thermoplastic molten material, including supplying an annular stream of thermoplastic material through a passageway substantially free of flow interuprtions having a plurality of axially aligned-annularly spaced feed ports, funneling and recombining the annular stream of thermoplastic material after being supplied through the feed ports to evenly recombine the thermoplastic material, and forming a tubular stream of thermoplastic film having a substantially uniform thickness throughout.

8 Claims, 3 Drawing Sheets

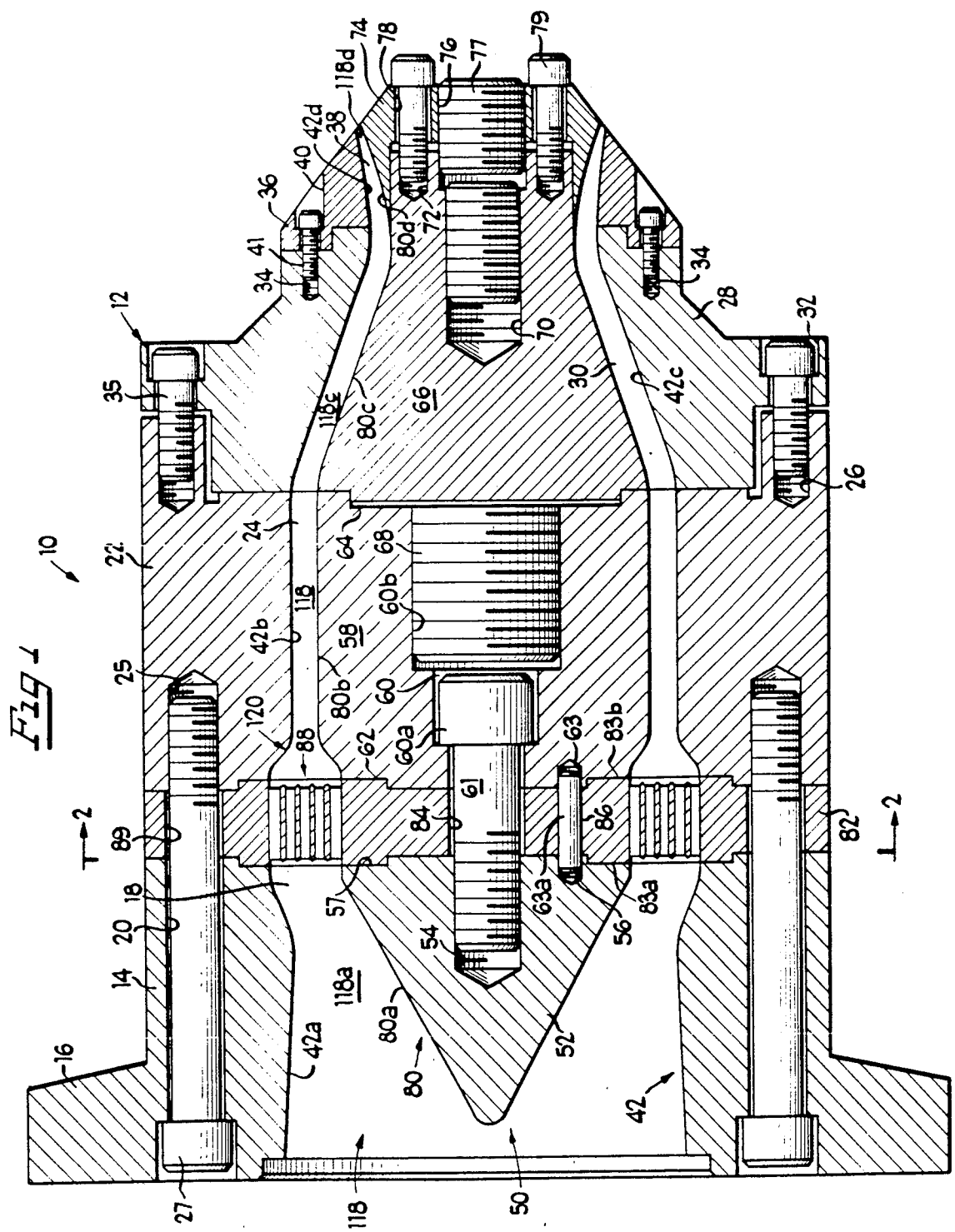

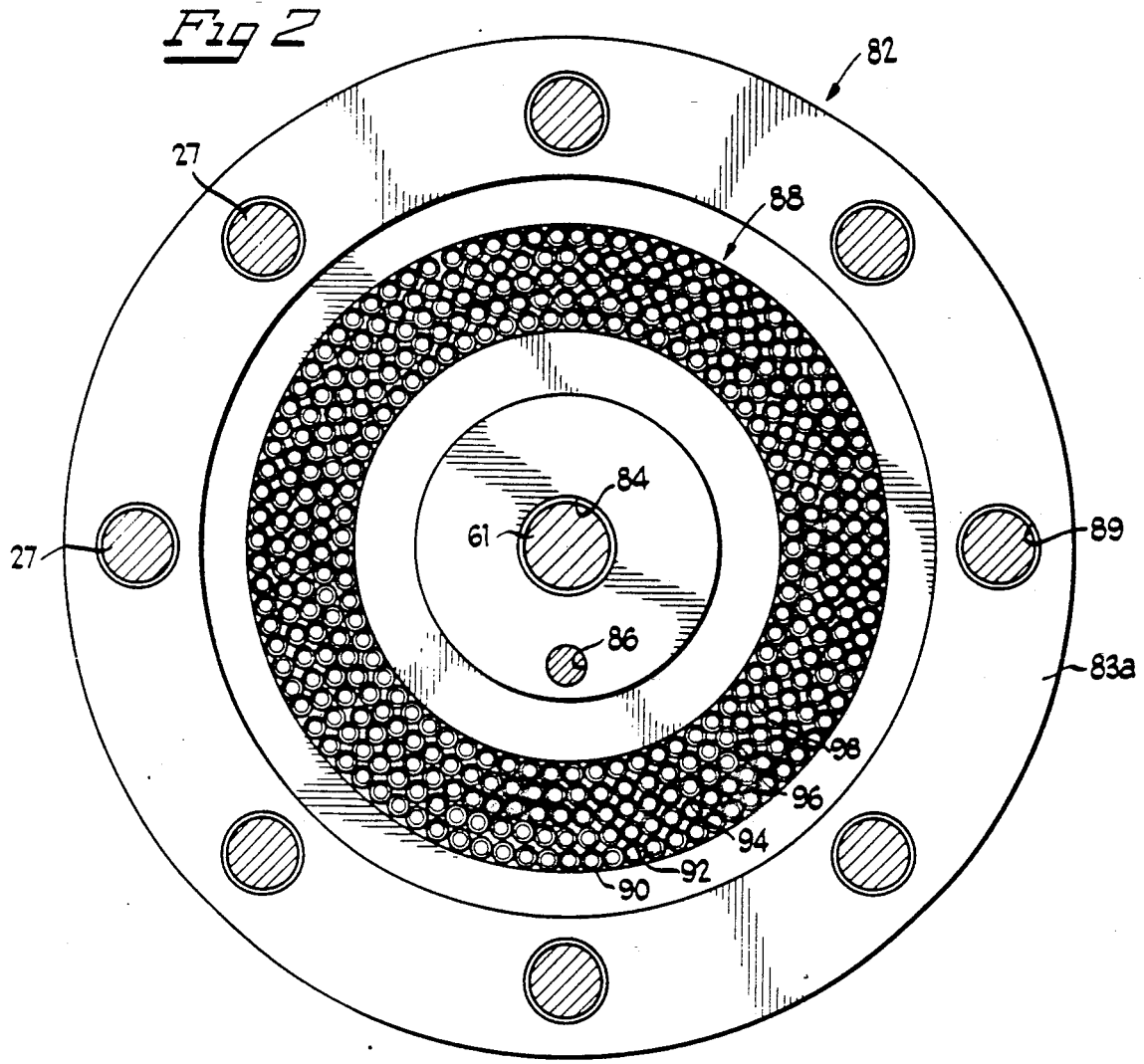
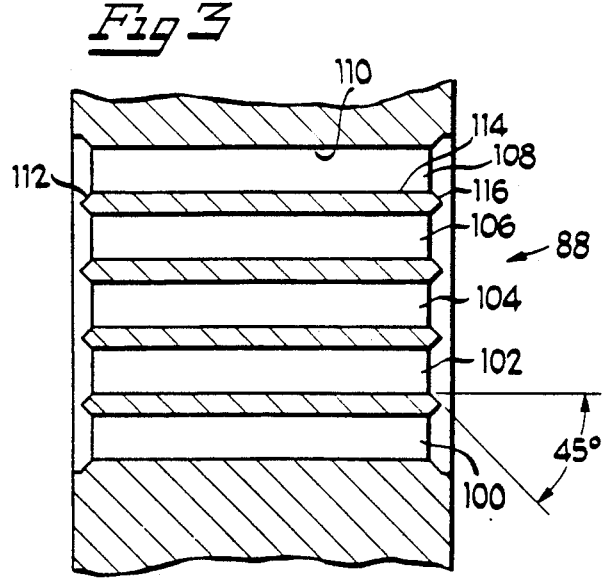

PROCESS FOR PRODUCING TUBULAR FILM FROM THERMOPLASTIC MOLTEN MATERIAL

This application is a continuation in part of Ser. No. 07/299,260, Jan. 23, 1989, now U.S. Pat. No. 4,931,237 issued June 05, 1990.

FIELD OF THE INVENTION

This invention relates to an extrusion die apparatus and process for producing tubular film from thermoplastic molten material, and more particularly relates to a tubular film-forming apparatus and process which provides a material having uniform thickness and superior surface appearance despite velocity, throughput or output rates, viscosity, temperature and pressure interruptions or fluctuations in the flow of thermoplastic material through the extrusion die.

BACKGROUND OF THE INVENTION

Many methods and apparatus for manufacturing thermoplastic film are known in the art.

A commercial apparatus, commonly referred to as a spider die, requires an outer tubular body within which is mounted an inner cylindrical mandrel. The mandrel is fixed relative to the body by a plurality of supports or spiders. In use, a molten thermoplastic material is fed through the annular space between the body and the mandrel and is changed in form from a cylindrical rod to a tube or film of the desired diameter. The film produced by the above process and apparatus, however, exhibits spider marks or irregularities thereon and therein due to the flow interruptions caused by the spiders. This is especially true when polystyrene foam is the thermoplastic material. Another problem associated with the spider dies is that since high internal pressure is required for the extrusion of the highly viscous heat plasticized thermoplastic material, the mandrel in the die is subject to movement, vibration and distortion causing undesirable nonuniformity in the thermoplastic material thickness. More particularly, as the flow rate or viscosity of the thermoplastic material varies, the mandrel can be tilted or moved horizontally and/or vertically. Yet another problem associated with spider dies is that the supports or spiders interrupt the flow of the thermoplastic film not only in proximity to where the thermoplastic material passes the spiders, but also throughout the film due to a "rippling affect" caused by the thermoplastic material bouncing off the spiders. In order to maintain uniformity of thickness and acceptable profiles, it is essential that frequent die adjustments be made and very precise process conditions be maintained, both of which are difficult feats to accomplish in practice.

In an attempt to solve the so-called "spider" or "weld" line problem, the above described spider die was modified with a "scooper design." The scooper design requires a slightly wider passageway between the body and the mandrel in precise axial alignment with and downstream of the spiders, which is accomplished by an indentation along the mandrel. The purpose of the scooper is to fill in the portion of the thermoplastic material that is displaced, diverted or obstructed by the spider section. However, many thermoplastic materials including polystyrene have a structural memory, which does not allow the material to be remended or reknit in this way.

An apparatus eliminating spiders has been used which requires an outer annular body within which is mounted an inner cylindrical mandrel fixed relative to the body by an L-shaped annular support flange in alignment with the mandrel. The mandrel requires a series of openings perpendicular to the mandrel and body, around the L-shaped support flange. The series of openings allows the plastic to pass through the annular space between the body and the mandrel. The series of openings are perpendicular to the flow passageway between the body and mandrel, thereby requiring added pressure therethrough. Further, the machining of the modified mandrel incorporating the L-shaped support flange with a series of openings is extremely difficult, costly and time-consuming.

It is therefore desirable to provide an improved extrusion die apparatus and process for producing tubular film from thermoplastic molten material which overcomes most, if not all, of the aforementioned problems.

An object of the present invention is to provide a film of thermoplastic material such as polystyrene, which has excellent characteristics, including superior surface appearance and smoothness.

Another object of the instant invention is to provide a tubular film of thermoplastic material which has a uniform thickness and profile despite velocity, throughput or output rates, viscosity, temperature, and pressure interruptions or fluctuations in the flow of the thermoplastic material through the extrusion die apparatus.

Another object of the instant invention is to produce a thermoplastic material exhibiting satisfactory gauge while eliminating weld or spider lines in the material.

SUMMARY OF THE INVENTION

An embodiment of the instant invention includes an extrusion die apparatus for producing tubular film from thermoplastic molten material, comprising a tubular housing having an axially aligned interior defining an inner surface; an elongated member including an outer surface disposed within said inner surface of said housing and spaced therefrom providing a passageway; and an alignment member having a plurality of annularly-spaced feed ports defining an inside surface, said alignment member securely connecting said elongated member to said housing, wherein said inner surface of said housing, said outer surface of said elongated member and said plurality of annularly-spaced feed ports define an annularly-axially aligned passageway for allowing a balanced flow of thermoplastic material therethrough.

Another embodiment of the instant invention includes a process for producing tubular film from a thermoplastic material, comprising supplying an annular stream of thermoplastic material through a die having a plurality of axially aligned-annularly spaced feed ports; funneling and recombining said annular stream of thermoplastic material after being supplied through said feed ports to evenly recombine said thermoplastic material; and forming a tubular stream of thermoplastic film having a substantially uniform thickness throughout.

BRIEF DESCRIPTIONS OF THE DRAWINGS

FIG. 1 is a cross-sectional view of an extrusion die apparatus for producing tubular film from a thermoplastic molten material of the present invention;

FIG. 2 of the drawings is an enlarged view taken at the 2—2 line of FIG. 1 in accordance with the practice of this invention;

FIG. 3 of the drawings is a partial enlarged cross-sectional view of FIG. 1 in accordance with the practice of this invention;

FIG. 4 of the drawings is an enlarged partial sectional view of another embodiment in accordance with the practice of this invention; and FIG. 5 is an enlarged elevational view taken at the 5—5 line of FIG. 4 in accordance with the practice of this invention.

DETAILED DESCRIPTION OF THE PREFERRED EMBODIMENTS

Figure 4:
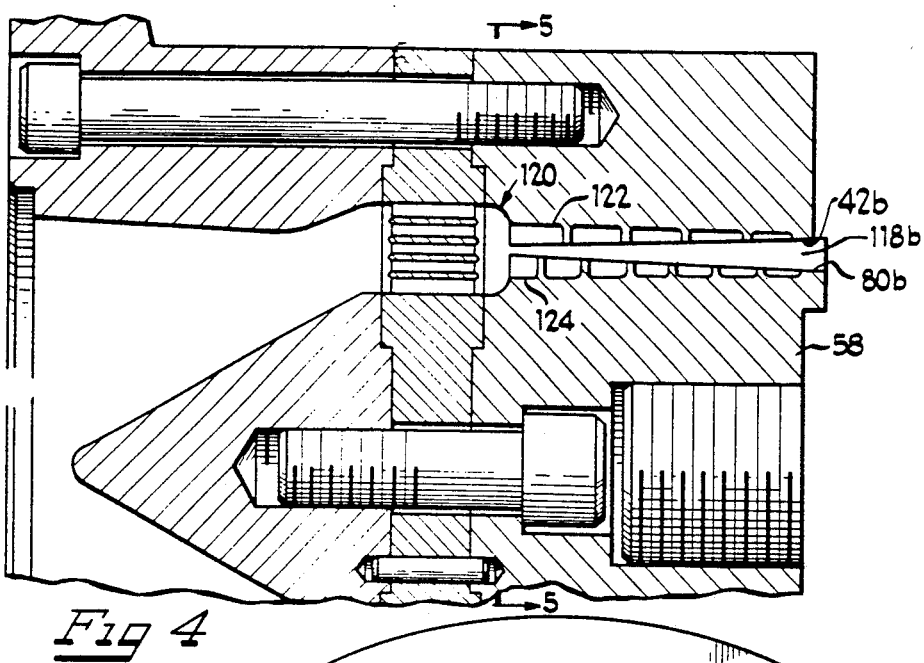

While this invention is susceptible of embodiments in many forms, there are shown in FIGS. 1-5 two embodiments suitable for use in the practice of this invention, with the understanding that the present disclosure is not intended to limit the invention to the embodiments illustrated.

Referring to FIG. 1, there is illustrated an extrusion die apparatus 10 for producing a tubular thermoplastic film. The extrusion die apparatus 10 is particularly adapted and configured to produce a tubular film of polystyrene foam.

The extrusion die apparatus 10 includes: (i) a tubular or elongated housing 12 having an axially aligned interior defining an inner surface 42; (ii) an elongated member 50 including an outer surface 80 disposed within the inner surface 42 of the tubular housing 12, and spaced therefrom providing a passageway; and (iii) an alignment member 82 having a plurality of annularly-spaced feed ports 88 defining an inside surface 110 (see FIG. 3), the alignment member 82 securely connects the elongated member 50 to the tubular housing 12, wherein the inner surface 42 of tubular housing 12, the outer surface 80 of the elongated member 50 and the plurality of annularly-spaced feed ports 88 define an annular-axially aligned passageway 118 for allowing a balanced flow of thermoplastic material therethrough.

More particularly, the tubular housing 12 is modular and includes a front section 14 having an annular flange 16, a middle section 22, a rear section 28, and an outer lip section 36. The annular flange 16 is adapted to provide a secure connection to an extruder, and can include several bores for bolting or fastening the front section 14 flange 16 to an extruder. The front section 14 includes a center-stream bore 18 defining a circular passageway for allowing thermoplastic material to pass through, and outer bores 20.

Moving downstream on tubular housing 12, is the middle or sleeve section 22, which includes a center-stream bore 24 in axial alignment with the center-stream bore 18 of front section 14 providing a passageway for allowing thermoplastic material to pass through. The middle section 22 facing the front section 14 includes threaded bores 25 in alignment with outer bores 20 of front section 14. The middle section 22 facing the rear section 28 includes outer bores 26. A bolt or fastening means 27 attaches the front section 14 and middle section 22 through outer bores 20 and threaded bores 25, respectively.

Moving downstream of the middle section 22 on tubular housing 12, is the rear section 28, which includes an inclined or inwardly converging center-stream bore 30 in axial alignment with center-stream bores 18 and 24. The middle section 22 further includes outer bores 32 in alignment with outer bore 26 of middle section 22, and threaded bores 34. Bolts or fastening means 35 securely attach the rear section 28 to the middle section 22.

The outer lip section 36 of tubular housing 12 is securely attached to and is downstream of the rear section 28. The outer lip section 36 includes an outwardly diverging center-stream bore 38 in axial alignment with center-stream bores 18, 24 and 30, and outer bores 40. Bolts or fastening means 41 securely attach the outer lip section 36 to the rear section 28.

The center-stream bores 18, 24, 30, and 38 define the interior or inner surface 42 of housing 12. The inner surface 42 is axially aligned along the longitudinal axis of the tubular housing 12. The inner surface 42 provides a smooth, uninterrupted and streamlined surface comprising inner surface sections 42a, 42b, 42c, and 42d of front section 14, middle section 22, rear section 28 and outer lip section 36, respectively.

Referring to FIG. 1, the elongated member, cylindrical torpedo or mandrel 50, includes four modular components disposed in and axially aligned with the tubular housing 12 comprising a nose section 52, a middle section 58, a rear section 66, and an inner lip section 74.

The nose 52, cone, or outwardly diverging section of the elongated member 50 is conical in shape. The nose 52 is configured to divert much of the molten thermoplastic material entering extrusion die apparatus 10 outwardly, thereby converting the cylindrical stream of molten thermoplastic material into a tubular stream. The nose section 52 includes an inside surface 57 facing downstream in the direction toward middle section 58, a center-threaded bore 54 and a locking indentation 56 on surface 57.

The middle section 58 of elongated member 50 is downstream of the nose section 52. The middle section 58 is generally tubular in shape including a center bore 60 having an unthreaded section 60a and threaded section 60b. Facing the nose section 52 is a substantially flat portion or front surface 62 of middle section 58, and alignment indentations 63. A bolt or fastening means 61 securely connects and attaches the middle section 58 to the nose section 52, while one or more alignment pins 63 align the middle section 58 to the nose section 52.

Immediately downstream of the middle section 58 on the elongated member 50, is the rear section or inwardly converging section 66. The rear section 66 includes a threaded male member 68 extending outwardly in the direction facing middle section 58, and at the opposite end a center-threaded bore 70 and outer bores 72. The rear section 66 is securely attached to the middle section 58 by screwing the male member 68 of rear section 66 into the female section provided by the threaded section 60b of the middle section 58.

The fourth component of elongated member 50 is the inner lip section 74. The inner lip section 74 is positioned downstream of the rear section 66, and is generally tubular in shape. The inner lip section 74 includes a center bore 76 and outer bores 78. A bolt or fastening means 77 securely attaches the inner lip section 74 to the rear section 66 of elongated member 50. Similarly, bolts or fastening means 79 also securely attach inner lip section 74 to the rear section 66.

The mandrel or elongated member 50 includes an outer surface section 80 comprising outer surface section 80a of nose section 52, outer surface section 80b of middle section 58, outer surface section 80c of rear section 66, and outer surface section 80d of inner lip section 74. The inner surface 42 of tubular housing 12 and the outer surface 80 of elongated member 50, provide an annular and axially aligned passageway for thermoplastic material to pass downstream therethrough, in the direction from the nose section 52 to and through the annular nozzle or orifice, which is defined by the opening between the inner and outer lip sections 74 and 36, respectively. In use, a tubular stream of thermoplastic material exits this nozzle.

As illustrated in FIG. 1, the alignment member 82, spiderless support or breaker, aligns and attaches the elongated member 50 within the inner surface 42 of the tubular housing 12. The alignment member 82 is configured to provide sufficient strength and integrity for holding, maintaining and aligning the elongated member 50 steady and securely in the dynamic environment the elongated member 50 is subjected to.

Referring to FIG. 1, in a preferred embodiment, the die 10 is free of spiders, bolts, or the like in passageway 118, and more particularly, free of spiders or bolting means extending from housing 12 to elongated member 50. Spiders and bolt means result in producing a film which exhibits spider marks or irregularities thereon and therein due to the flow interruptions caused thereby. The spider line problem is especially acute when polystyrene foam is the thermoplastic material to be produced. As previously stated, spiders interrupt the flow of the molten thermoplastic material not only in proximity to where the thermoplastic material passes the spider(s), but also throughout the film due to an undesirable rippling affect, caused by the thermoplastic material bouncing off the spider(s). In order to maintain uniformity of thickness and acceptable profiles, spider dies require frequent die adjustments and very precise process conditions, both of which are difficult to accomplish in practice. The die 10 and process described hereafter, have been carefully designed to minimize the problems associated with spider dies as described above.

All the components of the extrusion die apparatus 10 are configured to withstand harsh process conditions, such as pressures which may exceed 3000 psig, temperatures which may exceed 300° F. and velocities or throughput rates which may exceed 1200 lbs./hr.

Referring to FIG. 2, the alignment member 82 is disc-shaped, including a first surface 83a facing upstream and second surface 83b facing downstream. The alignment member 82 has a center bore 84, an alignment bore 86, annularly-spaced feed ports or openings 88, and outside bores 89 each of which are substantially perpendicular to the first and second surfaces 83a and 83b. In FIG. 1, the center bore 84 of alignment member 82 is in axial alignment with center-threaded bore 54 of nose section 52 and the center bore 60 of middle section 58, thereby allowing a bolt or fastening means 61 to securely fasten the nose section 52 to the middle section 58. The alignment member 82 is sandwiched between the nose section 52 and the middle section 58 thereby providing an excellent annular supporting device which prevents the elongated member 50 from tilting or moving horizontally or vertically within the housing 12.

The outside bores 89 of the alignment member 82 (FIGS. 2 and 3) allow the front section 14 and middle section 22 of tubular housing 12 to be securely attached to each other with attaching means or bolts 27, while sandwiching alignment member 82 therebetween.

Referring to FIG. 2, in a preferred embodiment, the alignment member 82 includes five rows or rings of annularly-spaced feed ports or openings 88 of varying diameter. The annularly-spaced feed ports 88 include a first row or outside ring 90, a second row or ring 92, a third row 94, a fourth row 96, and a fifth row 98. The alignment member 82 is configured to include five rows to provide a maximum volume of thermoplastic material to flow therethrough, while providing the integrity needed to withstand the harsh environment the extrusion die apparatus 10 is subjected to.

Illustrated in FIG. 3 is a partial exploded cross-sectional view of the rows 90, 92, 94, 96 and 98 in FIG. 2. The alignment member 82 in FIG. 3 includes a first, second, third, fourth, and fifth feed port 100, 102, 104, 106 and 108, corresponding to the first, second, third, fourth and fifth rows, 90, 92, 94, 96, and 98, respectively in FIG. 2. The feed ports 100, 102, 104, 106 and 108 are parallel and coextensive providing a plurality of openings from the first surface 83a to the second surface 83b of alignment member 82.

The annularly-spaced feed ports 88 are streamlined so as to: substantially equalize the flow of thermoplastic material around the circumference or outer surface 80 of elongated member 50; maximize the flow of thermoplastic material therethrough with minimal back pressure; minimize the possibility of stagnation or clogging; and minimize streaking and hang-up when the color of the thermoplastic material is changed.

The feed ports 88 in FIG. 3 include an inside surface 110 comprising an inlet section 112, a middle section 114, and an outlet section 116. The inlet and outlet sections 112 and 116 of inside surface 110, are each inclined at an angle of about 45° with respect to the middle section 114, to allow a maximum stream or flow of uniformly mixed plastic material therethrough while providing the integrity needed to withstand the forces and environment the alignment member 82 is subjected to. When polystyrene film is formed by the extrusion die apparatus 10 of this invention, a uniform profile, pattern, texture and surface appearance which satisfactorily eliminates or minimizes spider lines is produced.

As illustrated in FIG. 1, an annularly and axially aligned passageway 118 provides a tubular conduit or passageway in the extrusion die apparatus 10. The passageway 118 provides a suitable length wherein the thermoplastic material is allowed to stabilize before exiting the die 10. The passageway 118 is defined by the inner surface 42 of tubular housing 12, the outer surface 80 of the elongated member 50 and the annularly-spaced feed ports 88.

More particularly, the annularly-axially aligned passageway 118 moving downstream comprises: (i) section 118a which is defined by inner surface section 42a of tubular housing 12 and outer surface section 80a of elongated member 50; (ii) section 118b which is defined by inner surface 42b and outer surface 80b; (iii) the annularly-spaced feed ports 88 comprising the inside surfaces 110 of alignment member 82; (iv) section 118c which is defined by inner surface 42c and outer surface 80c; and (v) section 118d which is defined by inner surface 42d and outer surface 80d. The streamlined configuration of the annularly-axially aligned passageway 118, provides a large volume of substantially homogeneous or well-mixed thermoplastic material to flow therethrough with a minimal pressure drop, and minimizes the possibility of clogging.

As illustrated in FIG. 1, a portion of the annularly-axially aligned passageway 118 includes a funnel-shaped annularly and axially aligned passageway 120, which is positioned immediately downstream of alignment member 82, and is defined by inner surface 42b of tubular housing 12 and outer surface 80b of elongated member 50. The funnel-shaped annularly-axially aligned passageway 120 is axially aligned with and parallel to the annularly-spaced feed ports 88. The funnel-shaped annular-axially aligned passageway 120 provides a streamlined means for compressing, funneling, mixing, knitting, and recombining the thermoplastic material in the annular-axially aligned passageway section 118b, prior to exiting the extrusion die apparatus 10. The decreasing passageway of the funnel-shaped annular-axially aligned passageway 120 is configured to compress the thermoplastic material after passing the annularly-spaced feed ports 88 to improve the profile, pattern and surface appearance, texture and uniformity of the thermoplastic film prior to exiting the extrusion die apparatus 10.

Referring to FIG. 4, in a preferred embodiment the funnel-shaped annular-axially aligned passageway 120 includes a turbulency insert for improved stabilization of the thermoplastic prior to exiting the die 10. The turbulency insert includes an outer plurality of helical grooves 122 on inner surface section 42b of the tubular housing 12 and an inner plurality of helical grooves 124 on the outer surface section 80b of the elongated member 50. The turbulency insert can include the outer plurality of helical grooves 122 alone, the inner plurality of helical grooves 124 alone, or preferably the combination of both the outer and inner plurality of helical grooves 122 and 124 together twisting or turning in the same direction. The outer and inner plurality of helical grooves 122 and 124 can be of opposite hand for an opposite twisting effect while traveling downstream. The helical grooves form a twisting passageway for improved mixing, recombining and knitting of the thermoplastic material passing through annular-axially aligned passageway section 118b.

In a preferred embodiment, the depth of the helical grooves 122 and 124 in FIG. 4 decreases traveling downstream along inner surface 42b and outer surface 80b. The helical grooves 122 and 124 twist and provide a channel or groove along inner and outer surfaces 42b and 80b at an angle ranging from about 0° to 80° with respect to the axis provided by surfaces 42b and 80b, preferably from about 10° to about 50°, and most preferably about 30° thereby providing a twisting channel with at least one full turn.

Figure 5:
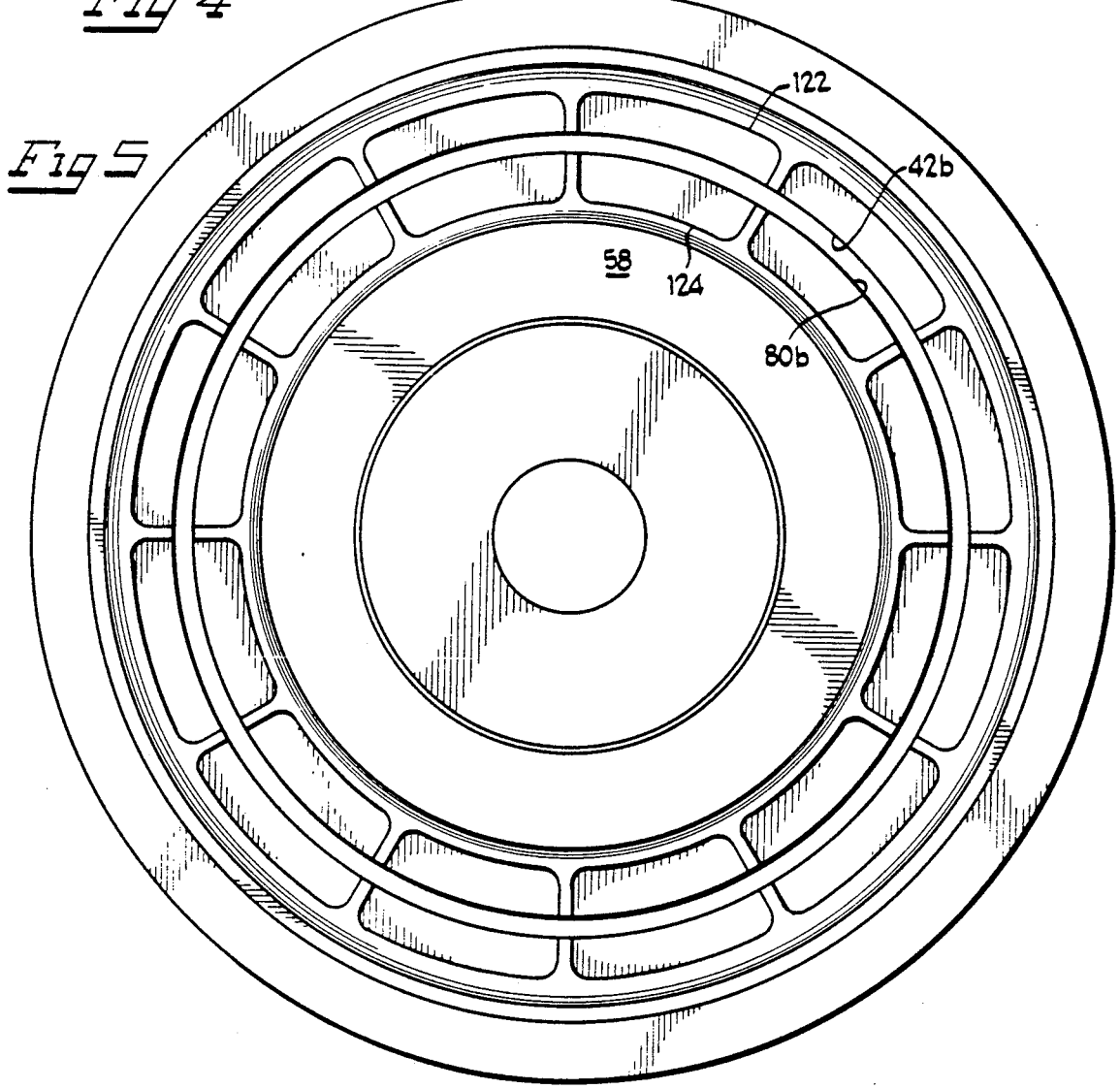

Referring to FIG. 5, in a preferred embodiment the turbulency insert includes at least twelve outer helical grooves 122 aligned with twelve corresponding inner helical grooves 124 for improved stirring, stabilizing and uniform mixing of the thermoplastic material in the die 10. However, the helical grooves 122 and 124 do not have to be aligned.

In the instant process for producing tubular film from a thermoplastic molten material incorporating the novel extrusion die apparatus 10 in FIG. 1, initially a cylindrical stream of thermoplastic material from an extruder is converted into an annular stream by the nose section 52 of the elongated member 50. More particularly, the thermoplastic material is directed, steered, or conveyed downstream through annular-axially aligned passageway section 118a defined by inner surface section 42a of housing 12 and outer surface section 80a of elongated member 52. Next, the annular stream of thermoplastic material is conveyed or continues to travel downstream through annular-axially aligned passageway 118 through the plurality of axially aligned annularly-spaced feed ports 88 of alignment member 82 wherein the thermoplastic material is uniformly mixed after traveling therethrough. In a preferred embodiment, the thermoplastic material made is a polystyrene foam.

Thereafter, the thermoplastic material moves downstream through annular-axially aligned passageway 118, where it is funneled, mixed, knitted and recombined in the funnel-shaped annular-axially aligned passageway 120. In a preferred embodiment, the annular-axially aligned passageway section 118b can include one or more helical grooves 122 and 124 on inner surface 42b and outer surface 80b, respectively, for an enhanced mix and recombination of the thermoplastic material, as illustrated in FIGS. 4 and 5. Thereafter, the tubular stream of thermoplastic material continues to travel downstream through annular-axially aligned passageway sections 118c and 118d exiting die 10, producing a thermoplastic film having a substantially uniform thickness and profile throughout.

The pressure in the process of this invention is sufficiently low so as not to alter the physical integrity of the extrusion die apparatus 10, yet sufficiently high to prevent pre-foaming therein.

The temperature of the process of this invention is sufficiently low so that the viscosity of the thermoplastic material exhibits sufficient melt strength, yet sufficiently high so as not to solidify, creating excessive pressure in the extrusion die apparatus 10.

Typical conditions of the process of this invention include pressures ranging from about 1000 psig to about 5000 psig, preferably ranging from about 1500 psig to about 2500 psig, and most preferably about 1800 psig to 2000 psig, and temperatures ranging from about 200° F. to about 400° F., preferably ranging from about 225° F. to about 300° F., and most preferably about 270° F. to about 300° F. When polystyrene foam is the thermoplastic material being produced, the pressure range of 1800-2000 psig provides optimal foam cell shaping and construction, optimal size, strength and density, and prevents prefoaming. Also for polystyrene foam, when output rates from the extruder are increased, the melt temperatures are correspondingly increased due to heat produced by the higher RPMs of the screw and the lower retention time of the polystyrene in the cooling extruder. The temperature range of 270° F. to 300° F. provides for higher output rates.

As previously stated, the instant process and novel extrusion die 10 are particularly adapted to producing a polystyrene film or sheet. Typically, the polystyrene is extruded from one or more extruders into an annular stream entering the extrusion die apparatus 10. In the die 10, the annular stream is converted into a tubular film. The film exiting the die 10 is then slit or cut to form a sheet. Optionally, one or more laminates and/or print can be applied to the sheet, as in U.S. Pat. No. 3,616,020 to Whelan and 3,669,794 to Mazur. And finally, the sheet is wound in rolls for aging, sale or subsequent thermoforming, shaping or molding.

The instant process incorporating the novel extrusion die apparatus 10, provides an efficient, effective and high volume method of forming a tubular film of a thermoplastic material exhibiting an excellent profile throughout, improved surface appearance and a uniform thickness.

As illustrated in FIG. 1, the instant process has been carefully designed to be free of spiders, bolts, and the like in passageway 118, thereby minimizing unwanted spider marks, irregularities and rippling in the foam produced herein.

The thermoplastic film produced by the extrusion die apparatus 10 and process described herein, can range from a wide variety of materials, including extrudable plastic materials, such as but not limited to polystyrenes, polysulphones, and polyethylenes.

These thermoplastic materials can, of course, be used in admixture with fillers, plasticizers, colorants, or other ordinary additives, provided they are in a state permitting melt extrusion. Moreover, these plastics can be combined to take advantage of the desirable properties of each thermoplastic, and a laminate can be applied to achieve the desired effect.

Blowing agents for thermoplastic materials are known. They are generally injected into the primary extruder. Any blowing agent useful for the production of thermoplastic foam can be used in the process and apparatus of the invention. For the preferred polystyrene foams, preferred blowing agents include: hydrocarbons selected from the group consisting of butane, propane and pentane; or $CO_2$, or mixtures thereof, as described in U.S. Pat. No. 3,160,688 to Aykanian, issued Dec. 8, 1964 and 3,658,973 to Aykanian, issued Apr. 25, 1972.

In a preferred embodiment, when polystyrene foam is the thermoplastic material being produced, the resin can include general purpose polystyrene or Impact Polystyrene, and most preferably Amoco General Purpose polystyrene R-1. Combinations of such resins can be used.

COMPARISON A

Molten polystyrene from a primary and secondary extruder was fed to a spider die. Butane was used as the blowing agent which was injected into the primary extruder. The resin used was Amoco General Purpose polystyrene R-1. The die included an outer tubular body within which was mounted an inner cylindrical mandrel supported therein. The mandrel was fixed relative to the outer tubular body by a single spider or bolt. The overall dimensions of this spider die included 10.5 inches in diameter, 16.25 inches in depth and a space between the mandrel and outer tubular body of 0.375 inches.

The molten polystyrene was fed through the annular space between the body and the mandrel, thereby being transformed in form from a cylindrical rod of molten polystyrene into a tube or film. The temperature and pressure of the molten polystyrene in the spider die were held at about 285° F. and 1600 psig, respectively. The foam exiting the die was then slit or cut to form a sheet, and was subsequently wound in rolls.

The polystyrene foam produced by this process and apparatus, however, exhibited spider marks or irregularities thereon and therein due to the flow interruption caused by the spider. In addition to the spider interrupting the flow of polystyrene in proximity to where the molten polystyrene passed the spider, the spider also caused the molten polystyrene to bounce off and be deflected by the spider, causing an undesirable "rippling affect," resulting in uneven thickness and an inconsistent profile.

Referring to Table 1, the average foam profile percent of the foam produced by this spider die was measured and recorded each day for ten (10) consecutive days. The foam profile percent was measured by the use of a nuclear gauge or device indicating the mass of a polystyrene foam sample for a certain area. In this case, the standard was 6.0 grams/100 inches$^2$. The average foam profile percent for the single spider die over this ten (10) day period was 12.4%, which indicates that the foam had an inconsistent thickness or profile which varied about ±6.2% from the standard.

EXAMPLE 1

After ten (10) days, the spider die was replaced with a spiderless die or extrusion die apparatus corresponding to item 10 of FIG. 1. The same resin and blowing agents used in Comparison A were also used in Example 1.

The overall dimensions of this die included a diameter of 10.5 inches, a depth of 16.25 inches; and a passageway of 0.375 inches with aligned-annularly spaced feed ports having a diameter of 0.156 inches, as illustrated in FIG. 1. Referring to Table 1, the instant die and process was also tested for ten (10) days, indicated as Day 11-20.

A cylindrical stream of molten polystyrene from a primary and secondary extruder was fed and converted into an annular stream in the die. The temperature and pressure of the molten polystyrene in the die was held at about 285° F. and 1900 psi, respectively. The higher die pressure was required to achieve the same throughput rate in Comparison A. The internal design of die 10 required a higher pressure to push the molten polystyrene through the feed ports 88 of the alignment member 82 of this die, than in the spider die in Comparison A. The tubular stream of molten polystyrene was thoroughly mixed after passing the plurality of axially aligned-annularly spaced feed ports of the annular-elongated passageway. Thereafter, the molten material was funneled and recombined after passing the feed ports. Subsequently, the molten polystyrene was formed and withdrawn into a foam exhibiting a substantially uniform thickness throughout. The foam exiting the die was them slit to form a sheet and subsequently wound into rolls.

The polystyrene film produced by this process and apparatus was substantially free of spider marks and irregularities and exhibited a consistent and uniform thickness. Referring to Table 1, the average foam profile percent for the foam produced herein was 8.41%, indicating the foam thickness varied only ±4.2% from the standard, which is a substantial improvement over the spider die in Comparison A. In addition to the above, this improvement results in a higher yield and more material being made within the desired specifications.

Although embodiments of this invention have been shown and described, it is to be understood that various modifications and substitutions as well as arrangements and combinations of process steps and equipment, can be made by those skilled in the art without departing from the novel spirit and scope of this invention.

TABLE 1

| Comparison A Single Spider Die | | Example 1 Extrusion Die Free of Spiders | |
|---|---|---|---|
| Day | Foam Profile Percent | Day | Foam Profile Percent |
| 1 | 11.3 | 11 | 7.5 |
| 2 | 14.4 | 12 | 6.9 |
| 3 | 12.9 | 13 | 6.5 |
| 4 | 12.1 | 14 | 6.5 |
| 5 | 12.5 | 15 | 11.2 |
| 6 | 11.9 | 16 | 8.5 |
| 7 | 12.8 | 17 | 9.3 |
| 8 | 12.8 | 18 | 9.2 |
| 9 | 12.2 | 19 | 8.8 |

TABLE 1-continued

| Comparison A Single Spider Die | | Example 1 Extrusion Die Free of Spiders | |
|---|---|---|---|
| Day | Foam Profile Percent | Day | Foam Profile Percent |
| 10 | 11.2 | 20 | 9.7 |
| AVERAGE | 12.41 | AVERAGE | 8.41 |

We claim:

1. A process for producing tubular film from a thermoplastic molten material, comprising:
   supplying an annular stream of thermoplastic material through a passageway substantially free of flow interruptions having a plurality of axially aligned-annularly spaced feed ports;
   funneling and recombining said annular stream of thermoplastic material after being supplied through said feed ports to evenly recombine said thermoplastic material; and
   forming a tubular stream of thermoplastic film having a substantially uniform thickness throughout.

2. A process for producing tubular film from a thermoplastic molten material, comprising:
   converting a cylindrical stream of thermoplastic material into an annular stream;
   conveying said annular stream of thermoplastic material through an annular-elongated passageway substantially free of flow interruptions having a plurality of axially aligned-annularly spaced feed parts;
   funneling said thermoplastic material through said annular-elongated passageway to substantially recombine and mix said thermoplastic material therein; and
   forming and withdrawing said annular stream of thermoplastic material having a substantially uniform thickness throughout.

3. The process of claim 1, wherein said thermoplastic material includes a pressure sufficiently high to prevent pre-foaming thereof prior to said forming and withdrawing step.

4. The process of claim 1, wherein said thermoplastic material includes a temperature sufficiently low so that the viscosity exhibits sufficient melt strength and sufficiently high so as not to solidify prior to said forming and withdrawing step.

5. The process of claim 2, wherein said thermoplastic material includes a pressure ranging from about 1000 psig to about 5000 psig.

6. The process of claim 2, wherein said thermoplastic material includes a temperature ranging from about 200° F. to about 400° F.

7. The process of claim 2, wherein said thermoplastic material comprises polystyrene foam.

8. The process of claim 2, wherein said passageway is free of spiders, bolts or the like.

* * * * *